United States Patent
Haag

(10) Patent No.: US 7,514,656 B2
(45) Date of Patent: Apr. 7, 2009

(54) METHOD FOR THE CONSTRUCTION OF AN INDUCTION HOB, AS WELL AS AN INDUCTION HOB

(75) Inventor: Thomas Haag, Oberhausen-Rheinhausen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 0 days.

(21) Appl. No.: 12/022,440

(22) Filed: Jan. 30, 2008

(65) Prior Publication Data

US 2008/0179316 A1 Jul. 31, 2008

(30) Foreign Application Priority Data

Jan. 31, 2007 (DE) .................. 10 2007 006 280

(51) Int. Cl.
*H05B 6/12* (2006.01)
(52) U.S. Cl. .............. 219/622; 219/624; 219/647; 219/662; 219/443.1
(58) Field of Classification Search ......... 219/620–627, 219/647, 649, 662, 671, 443.1–448.11; 29/602.1, 29/605, 606
See application file for complete search history.

(56) References Cited

U.S. PATENT DOCUMENTS

| 5,019,682 | A | | 5/1991 | Lee |
| 5,283,412 | A | | 2/1994 | Gouardo et al. |
| 5,488,214 | A | * | 1/1996 | Fettig et al. .................. 219/622 |
| 2006/0289489 | A1 | * | 12/2006 | Wang .......................... 219/622 |
| 2007/0278215 | A1 | | 12/2007 | Schilling et al. |

FOREIGN PATENT DOCUMENTS

| DE | 4208250 | 9/1993 |
| DE | 2555560 | 6/1997 |
| EP | 0711098 | 5/1996 |
| FR | 2334918 | 7/1977 |

OTHER PUBLICATIONS

Search Report dated Jun. 9, 2008, EP08001038, Filed May 29, 2008.
German Search Report from German Application No. 10 2007 006 280.1.

* cited by examiner

*Primary Examiner*—Philip H Leung
(74) *Attorney, Agent, or Firm*—Alston & Bird LLP

(57) ABSTRACT

An induction hob comprises an inductor support plate with an opening therein. The position and size of the opening are defined in such a way that the opening is equally spaced at its edges relative to at least three inductors to be fitted to the inductor support plate. A tray-like receptacle with a control mechanism and power electronics is fixed to the inductor support plate beneath the opening. The inductors are fixed to the other side of the inductor support plate and then electrically connected by connecting cables through this opening to the control mechanism and/or power electronics. Advantageously, the cable pass through the opening unimpeded.

17 Claims, 2 Drawing Sheets

METHOD FOR THE CONSTRUCTION OF AN INDUCTION HOB, AS WELL AS AN INDUCTION HOB

CROSS REFERENCE TO RELATED APPLICATIONS

This application claims priority to German Application Number 10 2007 006 280.1 filed on Jan. 31, 2007, the contents of which are incorporated by reference.

FIELD OF THE INVENTION

The invention relates to a method for the construction of an induction hob and to the induction hob itself, which is in particular constructed according to such a method.

BACKGROUND OF THE INVENTION

Often in the case of an induction hob, one or more openings or recesses are provided in an inductor support plate, normally centrally therein. Through the same inductors, located on the induction support plate, are connecting cables connected to a control mechanism beneath said plate. In the case where the inductors rest on the bearing side and from said side, a connection takes place to a control mechanism and/or power electronics. With certain distributions of the inductors, it can arise that one or more openings are at least partly concealed by an inductor. This means that during assembly the inductor first must be electrically connected before placing and fixing to the inductor support plate. This is in itself difficult and complicates the assembly procedures. The situation can also be such that an opening is relatively far removed from some inductors, which means that a relatively long connecting cable is needed. However, if such an inductor is positioned closer to the opening, such a long connecting cable is not only not necessary, but requires additional expenditure during installation, because it has to be stowed away and may be an interference or obstacle.

The problem of the invention is to provide an aforementioned method and aforementioned induction hob making it possible to avoid the problems of the prior art and in particular to lead in a simple manner to an efficient and appropriate installation, as well as to an efficiently constructed induction hob.

BRIEF DESCRIPTION OF THE DRAWINGS

Embodiments of the invention are described hereinafter relative to the attached diagrammatic drawings, wherein.

DETAILED DESCRIPTION OF THE EMBODIMENTS

Figure 1:
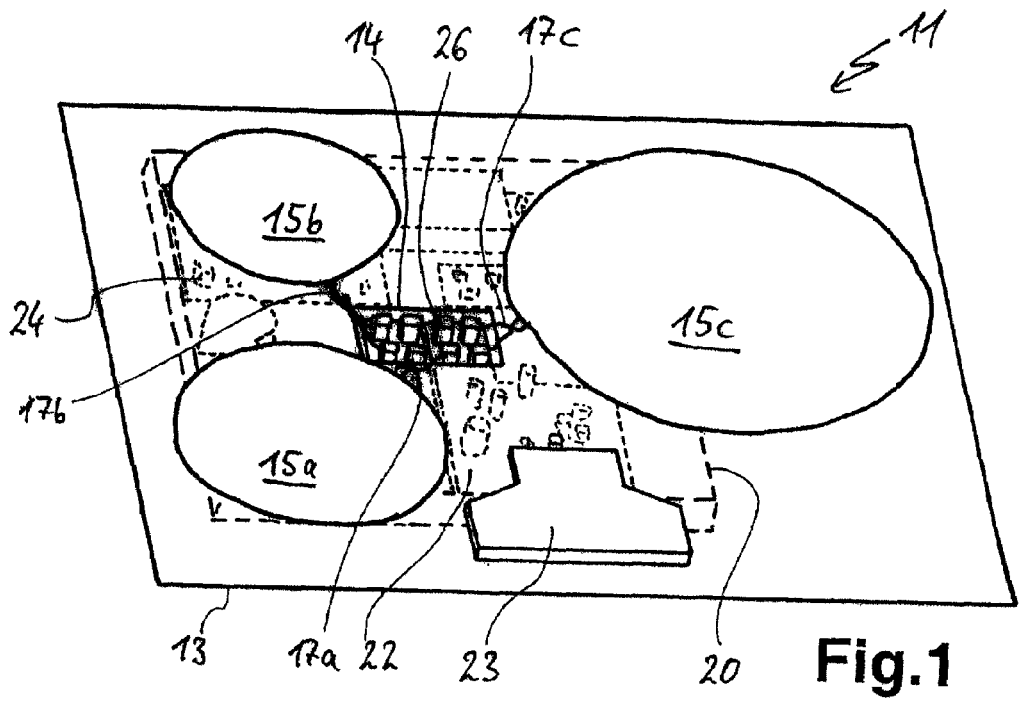
FIG. 1 illustrates an inclined view of one embodiment of the inventively constructed induction hob with devices in broken line form beneath an inductor support plate.

One embodiment of the present invention is a method of constructing a hob having the features of claim 1 and an induction hob having the features of claim 11. Advantageous and preferred developments of the invention form the subject matter of the further claims and are explained in greater detail hereinafter. Some of the subsequently indicated features are only mentioned for the method or only for the induction hob, but independently of this can apply both to the method and the hob.

An induction hob is typically constructed with an inductor support plate on which there are at least two inductors. Beneath the inductor support plate is positioned a fixed receptacle for a control mechanism or power electronics. Through an opening or recess in the inductor support plate, the inductors are connected via connecting cables to the control mechanism or power electronics. According to the invention, during the manufacturing of the opening or recess, or the manufacture of the inductor support plate, starting from a predetermined position of the inductors thereon, the position of the opening or recess is so determined that it is roughly centrally located in the space between the inductors. This means that the distance from the inductors to the opening is always roughly the same and does not differ significantly. Thus, inductors can in each case have similarly long connecting cables, which reduces the necessary number of types of connecting cables. It is also possible to avoid an inductor projecting significantly over the opening and covering the same. Advantageously the opening is completely upwardly free and not covered.

In an advantageous development, the invention also applies if an opening or recess is subdivided by one or more separating webs, or the like, into two or more partial openings or partial recesses, resulting in partial openings that are spatially closely juxtaposed. Therefore, such openings fulfil the function of a cable passage at a common location or in a common area. Thus, hereinafter reference is made to an opening or recess, even when there are in fact several openings or recesses separated by webs or the like.

Thus, within the scope of the invention, the inductor support plates are in each case adapted or specially manufactured for a specific distribution of the inductors, at least with regards to the opening or recess. However, the cost of adapting such plates is relatively limited and adapting the plates can be brought about in the case of a sheet metal inductor support plate by a single change or shifting of a punching tool. Subsequently, for each individual assembly process of the inductor hobs time can be saved and the probability of faults or errors reduced.

For determining the position of the opening or recess in the inductor support plate a number of possibilities exist. On the one hand, the opening or its center can be placed in the center of gravity of a polygon defined by the centers of the inductors. This can be advantageous if the connecting cables of the inductors emanate from their center. Alternatively, the opening can be so positioned that it, or its center, has roughly the same spacing with respect to all the inductors. In particular, such spacing is measured between a rim of the opening and an outer edge of the inductors. This can be advantageous if the connecting cables pass laterally out of the inductors and their length relates to said passing out section. Thus, the connecting cables must in each case bridge roughly the same distance to the opening, or to a connection to the control mechanism and/or power electronics.

Advantageously, the opening is upwardly free, or all the inductors have a spacing of at least a few millimeters (3 or more) from the rim of the opening or partial openings.

On the basis of geometrical considerations, it is clear that in the case of four or more inductors, which can be differently sized and whose placement on the support plate can vary, merely positioning an opening for the passage of connecting cables does not ensure the opening is equally spaced with respect to all the inductors. Conventionally, when designing such hobs, the size and position of the individual inductors is based on the hob size. An identical or symmetric spacing with respect to the opening is not always possible if the opening has a basic geometrical shape such as a rectangle, square or circle. Either the opening can differ from such a basic shape, for example, by having an elongated shape in a direction towards the most remote inductor, or alternatively, consideration can be given to a certain extent of the fact that the spacing of some inductors from the opening is somewhat longer than those of other inductors. However, particularly advantageously, a compensation takes place, so that ultimately all the spacings do not vary too significantly and the maximum number of spacings are very similar, particularly for the same inductor types.

The control mechanism and/or power electronics in the receptacle, which is fixed to the underside of the inductor support plate, can have connecting devices for the inductors or induction coils and for their connecting cables. In a preferred manner, said connecting devices are clips or connectors. It is possible here to position the control mechanism and/or the power electronics individually or these together with the receptacle under the inductor support plate or establish said position in such a way that the connecting devices are located beneath the opening in said support plate and advantageously substantially centrally with respect thereto. It is also possible, if the control mechanism and/or power electronics are placed on a support such as a board on which the connecting devices rest, to vary the position of the connecting devices on said support in a corresponding manner. In a further embodiment of the invention, the connecting devices are so distributed or positioned under the opening and also the opening size is so selected that all the connecting devices can be easily reached or their surface distribution is no greater than the opening.

In a development of the invention, the inductors can be permanently fixed to the inductor support plate or detachably by screw fasteners, for example, or immovably by a bonded joint. Advantageously, the inductors are first fixed to the inductor support plate and then electrically connected to the power electronics. Thus, the aforementioned reach for the connecting cables of the connecting devices through the opening is particularly advantageous.

An induction hob according to the invention can be constructed according to an above-described method, although this is not necessarily the case. In addition to the above-described mechanical or constructional structure, it is important that the position of the opening or recess in the inductor support plate, through which the inductors located thereon can be connected by connecting cables to a control mechanism and/or power electronics under the inductor support plate, is located roughly centrally in a space between the inductors. The position and/or size, as well as the design of the opening, can either be oriented with respect to center or centers of gravity of the inductors or the outer edge or contour thereof.

Whereas the inductor support plate is made from sheet metal, for example aluminium, the receptacle is advantageously made from plastic. It can be a flat tray and, for example, have the same basic shape as the inductor support plate and even has roughly the same lateral length ratios. Advantageously, the receptacle is so positioned on the inductor support plate that the opening is roughly positioned above its center or center of gravity.

These and further aspects can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

Turning now to the Figures, FIG. 1 shows an embodiment of an inventively constructed induction hob 11, which is ready to operate when a glass ceramic plate or the like would be placed on top of it. The induction hob 11 has an inductor support plate 13, which essentially defines the surface area of induction hob 11. Three differently sized inductors 15a, 15b and 15c are distributed over the inductor support plate 13. In an area between the inductors 15a-c, the inductor support plate 13 has a rectangular opening 14. It can be seen that the opening 14 has a similar spacing, particularly a few centimeters, with respect to the outer edges of inductors 15a-c.

Beneath the inductor support plate 13 is provided a receptacle 20 (shown using broken line representation), which is constructed in the manner of a shallow box or tray, and can be made from plastic. Beneath the inductor support plate 13 is a control mechanism 22, also shown in broken line form, that is placed in the receptacle 20 with a corresponding circuit board and components shown in broken line form. In the front central area of the induction hob 11 and above control mechanism 22 is provided an operating device 23, which, for example, may comprise touch switches and/or displays (not shown) connected to control mechanism 22. Operating device 23 rests on the inductor support plate 13.

The receptacle 20 also contains power electronics 24, which is represented to the rear and left in broken line form and is advantageously placed on a different circuit board to the control mechanism 22. The power electronics 24 are constructed in the conventional manner for such inductors 15 or induction hobs 1. For the three inductors 15a-c there can also be multiple power electronics, or in each case, a single power electronic on a different support.

Terminals 26 are visible below opening 14 and to them are connected the connecting cables 17a-c of inductors 15a-c. The terminals 26 can be located on the same circuit board as control mechanism 22 or power electronics 24. The terminals 26 have a conventional construction and can comprise screw terminals. The connecting cables 17a-c emanating from inductors 15a-c are connected at the exposed ends by terminals 26 to control mechanism 22 and/or power electronics 24.

FIG. 1 shows that the length of all three connecting cables 17a-c is being roughly the same, at least when measured from the outer edge of the inductors. It is also clear that when there are three inductors. As a function of the aforementioned measuring method, i.e., either the spacing to the outer edge or the spacing from a center of an inductor, there is a single intermediate point or area, which can be different with four inductors.

Figure 2:
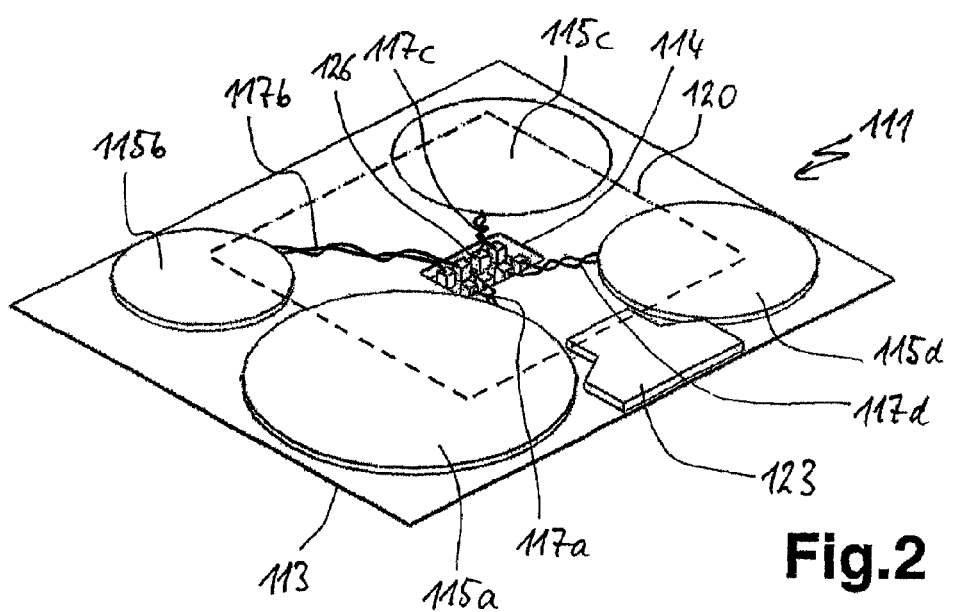
FIG. 2 illustrates another embodiment of the inventively constructed induction hob similar to FIG. 1 with four inductors.

FIG. 2 shows an alternative development of an inventively constructed induction hob 111, which once again has inductors, but this time it has four inductors 115a-d on an inductor support plate 113. Beneath the inductor support plate 113 there is once again a receptacle 120 and on this occasion the control mechanism and power electronics are not shown. In the front central area an operating device 123 is located on the inductor support plate 113.

In an intermediate area between inductors 115a-d, there is provided an opening 114 in inductor support plate 113, which is rectangular as in FIG. 1. Beneath opening 114 are provided terminals 126 which connect to the connecting cables 117a-d of inductors 115a-d.

It is clear that only in certain instances when there are four inductors will there be a precisely located intermediate point. According to FIG. 2, the position of opening 114 in inductor support plate 113 is so chosen that it has at least roughly the same distance from the three inductors 115a, c and d, or their outer edge. Thus, the connecting cables 117a, c and d can have roughly the same length. However, the left-hand, rear inductor 115b has a much longer connecting cable 117b and is much further removed from opening 114. This could be avoided by extending the opening 114 further towards the inductor 115b and also the associated terminals 126, so that connecting cable 117b also has the same length as the other connecting cables. However, when there are identically sized inductors, which are normally of the same construction or type, such as inductors 115c and 115d, the same spacing exists from these inductors to the opening 114 and therefore equally long connecting cables 117c and 117d exist.

According to another embodiment of the invention, construction of an induction hob involves moving the opening 114 towards inductor 115b to such an extent that it is placed precisely between inductors 115b and 115d and therefore also simultaneously be between inductors 115a and 115c. However, then either the same connecting cables 117c and 117d of the same type of inductor 115 would have to have different lengths or their superfluous length through opening 114 would have to be stowed under the inductor support plate 113.

Figure 3:
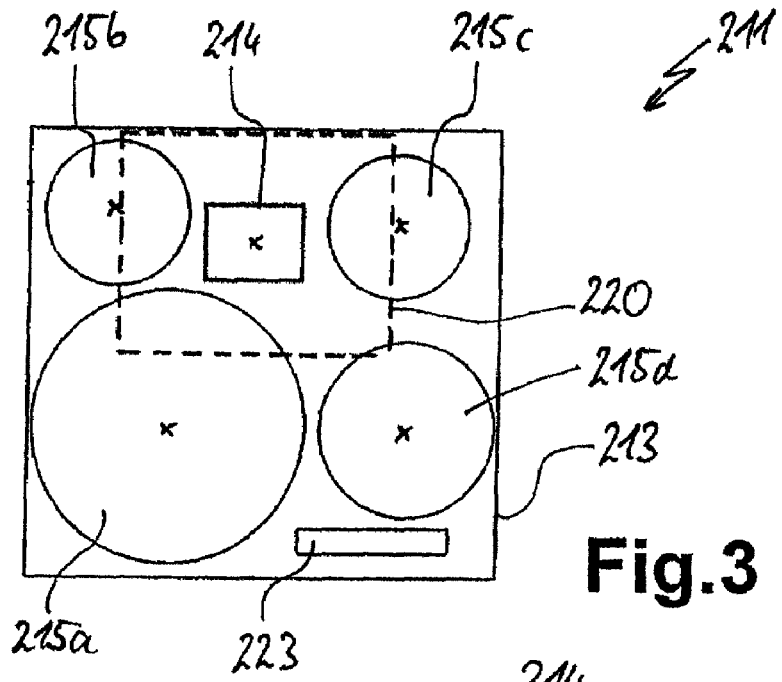
FIG. 3 illustrates a diagrammatic plan view of another embodiment of an induction hob similar to FIG. 2.

A further embodiment of the induction hob 211 is shown in FIG. 3 in plan view from above. Once again, there are four inductors 215a-d on inductor support plate 213 and located at the front right is a resting operating device 223. Inductor support plate 213 has a rectangular opening 214. Below the inductor support plate 213 and roughly centrally with respect to opening 214 is provided a receptacle 220 corresponding to that from FIG. 1 for a control mechanism and power electronics (not shown).

In the embodiment according to FIG. 3, both the opening 214 and the receptacle 220 are provided relatively far to the rear on induction hob 211 or inductor support plate 213. Thus, this location varies from a mutual central positioning similar to FIG. 2.

FIG. 3 also shows how opening 214 has roughly the same spacing from the three inductors, namely 215a-c. However, once again the spacing from the two identically constructed inductors 125b and 125c is the same, so that they can be provided with connecting cables 217b and 217c of the same length. The centres are marked by a small cross for inductors 215, opening 214 and receptacle 220.

Figure 4:
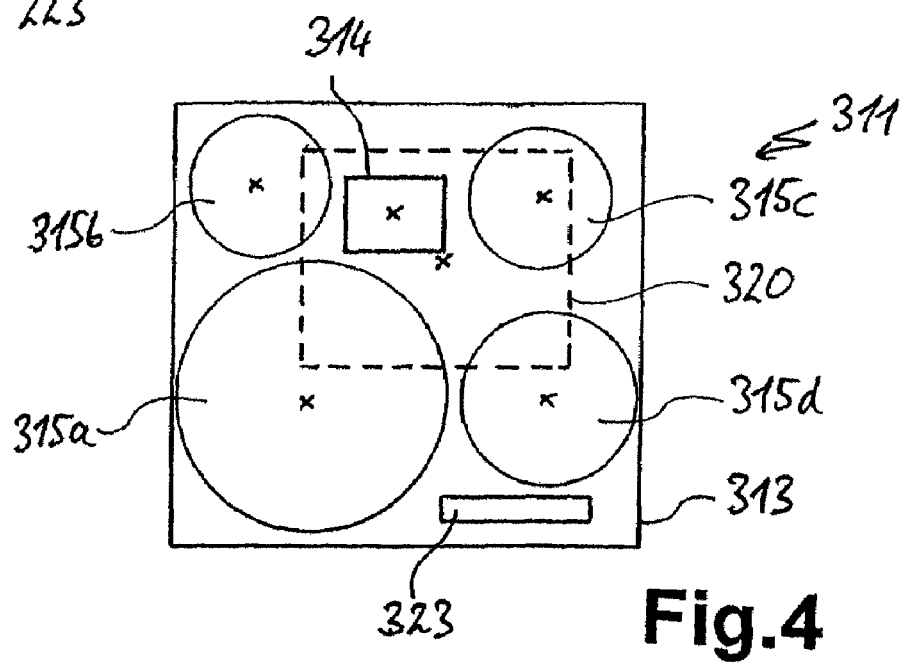
FIG. 4 illustrates another embodiment of an induction hob similar to FIG. 3.

FIG. 4 shows a further embodiment of an induction hob 311 similar to FIG. 3. Compared with FIG. 3, the nature and position of the inductors 315a-d on inductor support plate 313 are the same, as is the operating device 323 and opening 314. However, compared to FIG. 3, a change exists with regards to the position of receptacle 320 below inductor support plate 313, as is apparent from the broken line representation. Thus, receptacle 320 is not positioned centrally with respect to opening 314, which is apparent from the differently positioned crosses marking the respective centers. Thus, this means that for the design of the control mechanism, there are certain changes required to the power electronics and terminals. However, this makes it possible to avoid positioning the receptacle 320 to the far rear at the back edge of the induction hob 311 and is instead positioned towards the centre.

The inventive induction hob 11 according to FIG. 1 can for example be constructed in that in receptacle 20 are placed, and optionally fixed, control mechanism 22, power electronics 24 and terminals 26. The receptacle 20 is then attached and fixed beneath the inductor support plate 13. The inductors 15a-c are then mounted on the inductor support plate 13 and fixed thereto, for example by bonding and are connected to terminals 26 by their connecting cables 17a-c. Operating device 23 is then connected to control mechanism 22, for example by means of a cable (not shown), which in the same way as the connecting cable 17 passes through opening 14 and can extend to a plug-in device. Operating device 23 is then mounted on and fixed to inductor support plate 13 and then a glass ceramic hotplate can be placed and fixed thereto.

The invention claimed is:

1. A method for the construction of an induction hob, said induction hob comprising an inductor support plate having an opening, a plurality of inductors and a receptacle for a control mechanism and power electronics wherein said control mechanism controls said plurality of inductors and said power electronics provides power to said plurality of inductors, said receptacle having positioned thereon a printed circuit board comprising a plurality of respective connecting devices for said induction hob, comprising the steps of:

attaching said plurality of inductors on a first side of said inductor support plate in a respective predetermined position such that a space is defined between said inductors, wherein each of said inductors comprise a respective connecting cable for connection to said control mechanism and said power electronics via said plurality of respective connecting devices, wherein said respective connecting cable passes through said opening in said inductor support plate, wherein said opening is centrally positioned in said space between said inductors;

attaching said receptacle for said control mechanism and power electronics on a second side of said inductor support plate wherein at least a portion of said printed circuit board is positioned in said opening such that said respective connective devices are located at said opening;

passing said respective connecting cable through said opening in said inductor support plate; and connecting said respective connecting cable to said control mechanism and said power electronics via said respective connective devices.

2. The method according to claim 1, wherein a center of said opening is placed in a center of a polygon formed by center points of said inductors.

3. The method according to claim 1, a center of said opening has approximately a same first distance from said center to each respective said edge of each one of the plurality of inductors.

4. The method according to claim 1, a rim exists around said opening, and wherein each of said inductors has a distance to said rim of at least a few millimeters.

5. The method of claim 1 wherein said connecting devices are positioned so as to allow passage of said connecting cables through said opening without said connecting cables contacting said inductor support plate.

6. The method according to claim 1, wherein said connecting devices are positioned centrally with respect to said receptacle.

7. The method according to claim 1, wherein said receptacle is positioned centrally with respect to said opening.

8. The method according to claim 1, wherein said inductors are permanently affixed to said inductor support plate.

9. An induction hob comprising:

an inductor support plate, said plate having an opening;

a plurality of inductors wherein said inductors are affixed on a first side of said inductor support plate in a respective predetermined position, wherein a space is defined between said plurality of inductors, wherein said opening is centrally located in said space;

a control mechanism and power electronics, wherein said control mechanism controls said plurality of inductors and said power electronics provides power to said plurality of inductors;

a receptacle comprising said control mechanism and power electronics of said induction hob, wherein said receptacle is affixed to a second side of said inductor support plate, said receptacle having positioned thereon a printed circuit board comprising a plurality of connecting devices such that said plurality of connecting devices are located at said opening; and a connector cable for each respective one of said plurality of inductors, wherein each said connecting cable passes through said opening and is connected to said connective devices.

10. The induction hob according to claim 9, wherein said a first center of said opening is in a second center of a polygon formed by a plurality of centers of said inductors.

11. The induction hob according to claim 9, wherein said a center of said opening has a same distance from said center with respect to all an edge of said respective inductors.

12. The induction hob according to claim 9 wherein a rim is defined by said opening such that there exists a same respective distance from a respective point on said rim to an edge of one of said respective inductors.

13. The induction hob according to claim 12 wherein each one of said respective inductors has a spacing from said rim of said opening of at least a few millimeters.

14. The induction hob according to claim 9, wherein an area encompassing said connecting devices is smaller than said opening.

15. The induction hob according to claim 9, wherein said receptacle is positioned central relative to said opening.

16. The induction hob according to claim 9, wherein said receptacle is shaped as a tray.

17. The induction hob according to claim 9, wherein said connecting cables of some but not all inductors are equal in length.

* * * * *